(12) United States Patent
Ferguson

(10) Patent No.: US 7,575,617 B2
(45) Date of Patent: Aug. 18, 2009

(54) INTEGRAL FILTER AND GRILL ASSEMBLY FOR A COLD AIR RETURN

(76) Inventor: Gary D. Ferguson, 289 Whippoorwill, Wright City, MO (US) 63390

(*) Notice: Subject to any disclaimer, the term of this patent is extended or adjusted under 35 U.S.C. 154(b) by 315 days.

(21) Appl. No.: 11/383,628

(22) Filed: May 16, 2006

(65) Prior Publication Data

US 2007/0266685 A1 Nov. 22, 2007

(51) Int. Cl.
*B03C 3/30* (2006.01)
*B01D 25/00* (2006.01)

(52) U.S. Cl. ............................ 55/480; 55/481; 55/490; 55/491; 55/492; 55/493; 55/495; 55/508; 55/511; 55/DIG. 32; 55/DIG. 31; 55/DIG. 37; 454/309

(58) Field of Classification Search .................. 55/480, 55/481, 490, 491, 492, 493, 495, 508, 511, 55/516, DIG. 32, DIG. 35, DIG. 37; 454/309
See application file for complete search history.

(56) References Cited

U.S. PATENT DOCUMENTS

| | | | |
|---|---|---|---|
| 2,575,499 A | 11/1951 | Manow | |
| 2,789,663 A * | 4/1957 | Camp | ............................ 55/513 |
| 2,825,500 A | 3/1958 | McLean | |
| 3,046,719 A | 7/1962 | Tropiano | |
| 3,169,475 A * | 2/1965 | Caouette | .................. 101/127.1 |
| 3,853,529 A | 12/1974 | Boothe et al. | |
| 4,334,899 A | 6/1982 | McConnell | |
| 4,394,147 A | 7/1983 | Caddy et al. | |
| 4,521,234 A | 6/1985 | Peebles, Jr. et al. | |
| 4,843,835 A | 7/1989 | Goetz | |
| 5,045,184 A * | 9/1991 | Arkles | .......................... 209/405 |
| 5,100,445 A | 3/1992 | Johnson et al. | |
| 5,176,570 A * | 1/1993 | Liedl | ........................... 454/309 |
| 5,188,646 A | 2/1993 | Nolen, Jr. | |
| 5,525,145 A * | 6/1996 | Hodge | ............................. 96/17 |
| 5,863,310 A * | 1/1999 | Brown et al. | .................... 55/480 |
| 5,944,860 A * | 8/1999 | Mack et al. | ..................... 55/492 |
| 6,030,427 A * | 2/2000 | Sorice et al. | ................... 55/480 |
| 6,126,708 A * | 10/2000 | Mack et al. | ..................... 55/502 |
| 6,716,267 B2 * | 4/2004 | Lawlor, Sr. | .................... 55/506 |
| 6,942,710 B2 * | 9/2005 | Milano | ......................... 55/480 |

OTHER PUBLICATIONS

File History of U.S. Appl. No. 08/775,774, Gary D. Ferguson, Dec. 1996.

* cited by examiner

*Primary Examiner*—Jason M Greene
*Assistant Examiner*—Minh-Chau T Pham
(74) *Attorney, Agent, or Firm*—Polster, Liedar, Woodruff & Lucchesi, LC

(57) ABSTRACT

A grill and filter assembly having a replaceable filter element includes a rectangular frame assembly, grill insert and a filter. The rectangular frame assembly has an outer frame forming a face and an outwardly extending wall extension. The grill insert has a plurality of louvers and an outwardly extending filter housing. It also includes a plurality of flanges extending inwardly from the filter housing to a depth of no greater than the thickness of standard drywall. The filter assembly includes a loop covered with a fabric filter material. The loop is capable of flexure and the filter is inserted within the filter housing and under the flanges. A plurality of magnets are attached to the wall extension and located to magnetically hold the grill insert within the frame assembly. The flanges and filter housing are structurally adapted to allow the filter to be flexed and slid from under the flanges to remove it from the grill insert.

15 Claims, 5 Drawing Sheets

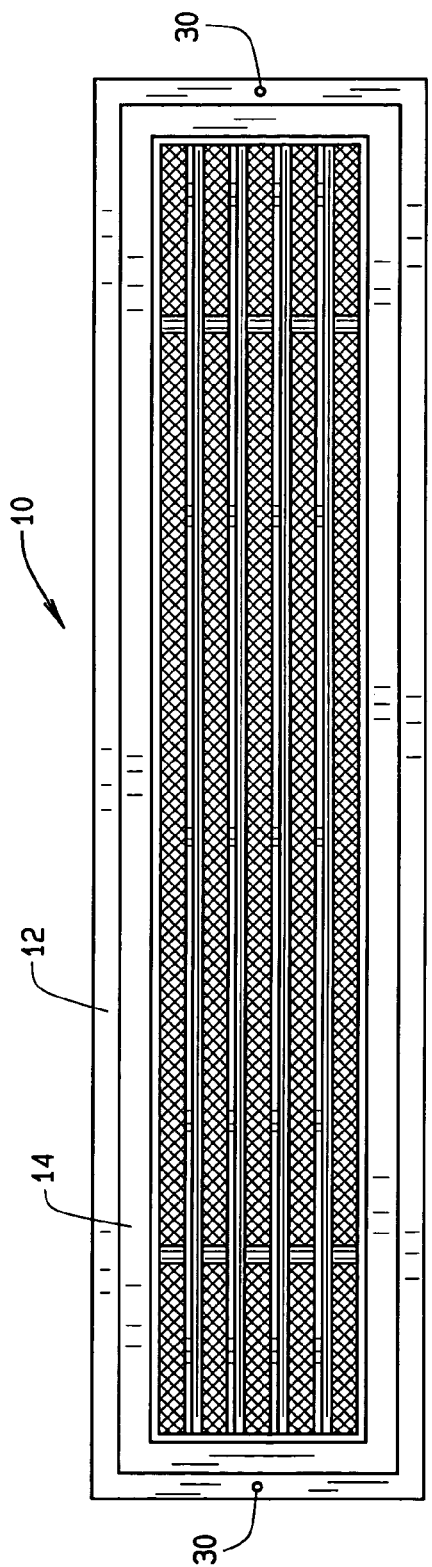
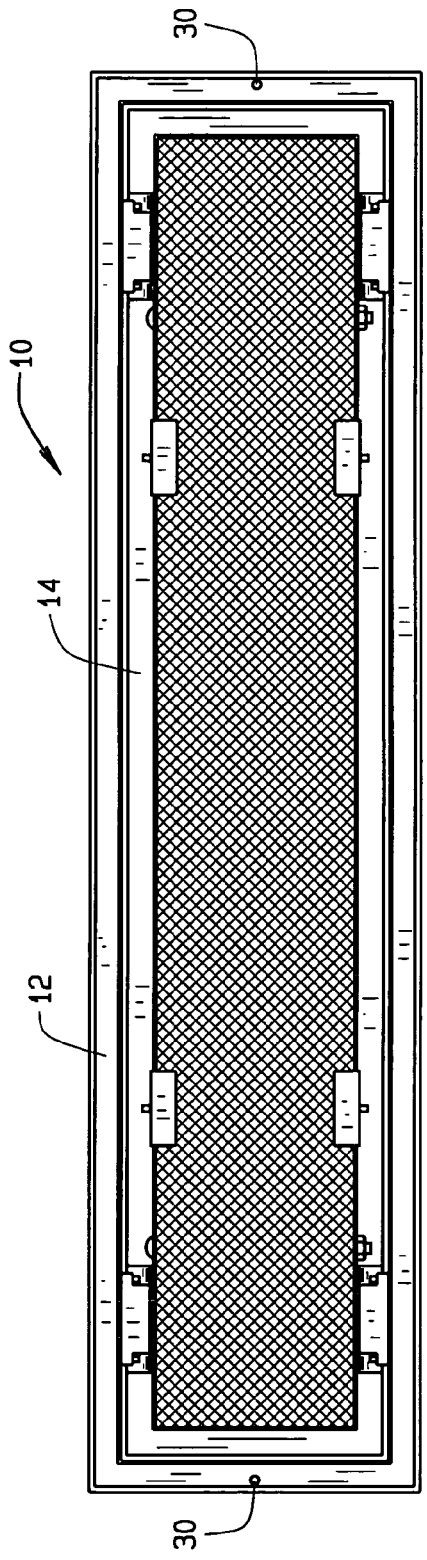
FIG. 1
FIG. 2

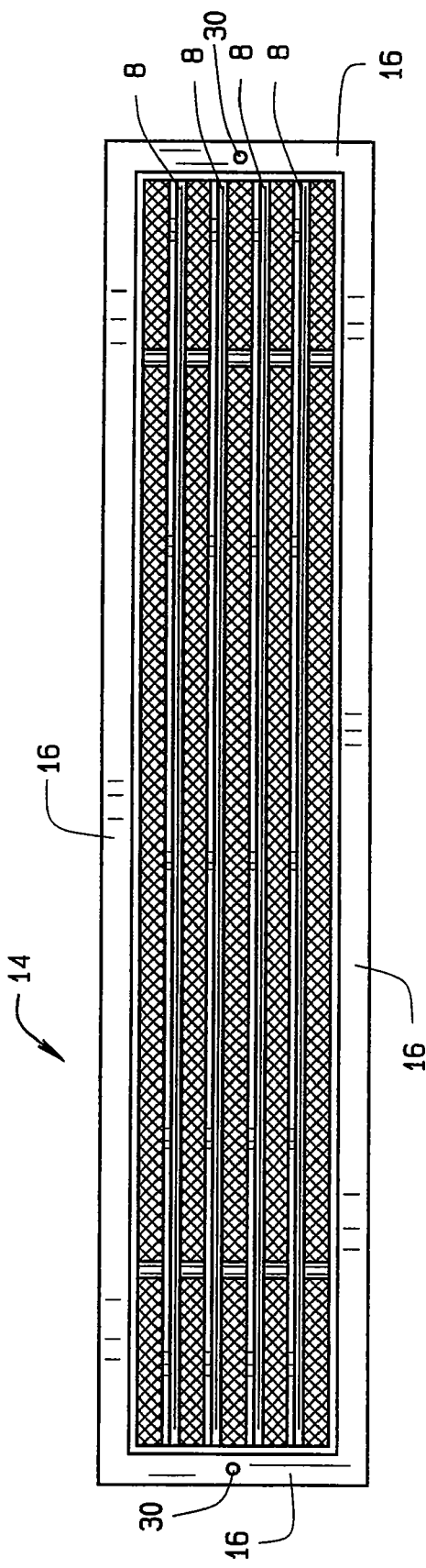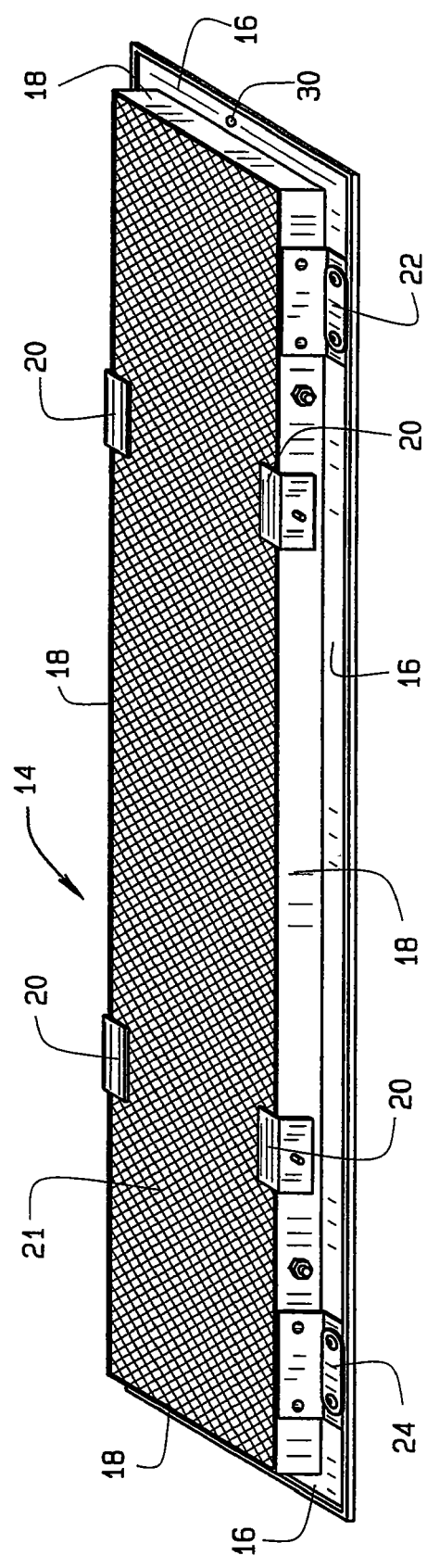

INTEGRAL FILTER AND GRILL ASSEMBLY FOR A COLD AIR RETURN

FIELD OF THE INVENTION

This invention relates to a combination filter and grill for heating and air conditioning systems.

BACKGROUND OF THE INVENTION

U.S. Pat. No. 4,334,899 discloses a snap filter grill and assembly including a grill 16, a filter element 24, and a frame 12. However, in this construction, the filter is a separate member from the grill, the grill is made of metal and this design is more expensive than the integral grill and filter of the present invention.

U.S. Pat. No. 2,575,499 discloses a removable glass filter 23, which sits within a pivotable grill 15 into a frame 12. However, in this design the filter element 23 is removable and is not integral with the grill 14. Furthermore, this design is more expensive than the integral grill and filter of the present invention.

U.S. Pat. No. 3,046,719 discloses a room register having a frame 8, a grill 18, and a filter 17. This assembly is designed to be located on the floor for heating or cooling air to enter the room. However, in this design the filter element 17 is separately removable from the grill 18. Thus, this design would be more expensive than the integral filter and grill of the present invention.

SUMMARY OF THE INVENTION

The present invention provides a grill and filter assembly having a replaceable filter element includes a rectangular frame assembly, grill insert and a filter. The rectangular frame assembly has an outer frame forming a face and an outwardly extending wall extension. The grill insert has a plurality of louvers and an outwardly extending filter housing. It also includes a plurality of flanges extending inwardly from the filter housing to a depth of no greater than the thickness of standard drywall. The filter assembly includes a loop covered with a fabric filter material. The loop is capable of flexure and the filter is inserted within the filter housing and under the flanges. A plurality of magnets are attached to the wall extension and located to magnetically hold the grill insert within the frame assembly. The flanges and filter housing are structurally adapted to allow the filter to be flexed and slid from under the flanges to remove it from the grill insert.

BRIEF DESCRIPTION OF THE DRAWINGS

FIG. 1 is a front plan view of a grill and frame according to an embodiment of the present invention;

FIG. 2 is a rear plan view of a grill and frame according to an embodiment of the present invention;

FIG. 3 is a front plan view of a grill insert according to an embodiment of the present invention;

FIG. 4 is a side perspective view of a grill insert according to an embodiment of the present invention;

DESCRIPTION OF THE PREFERRED EMBODIMENT

Figure 5:
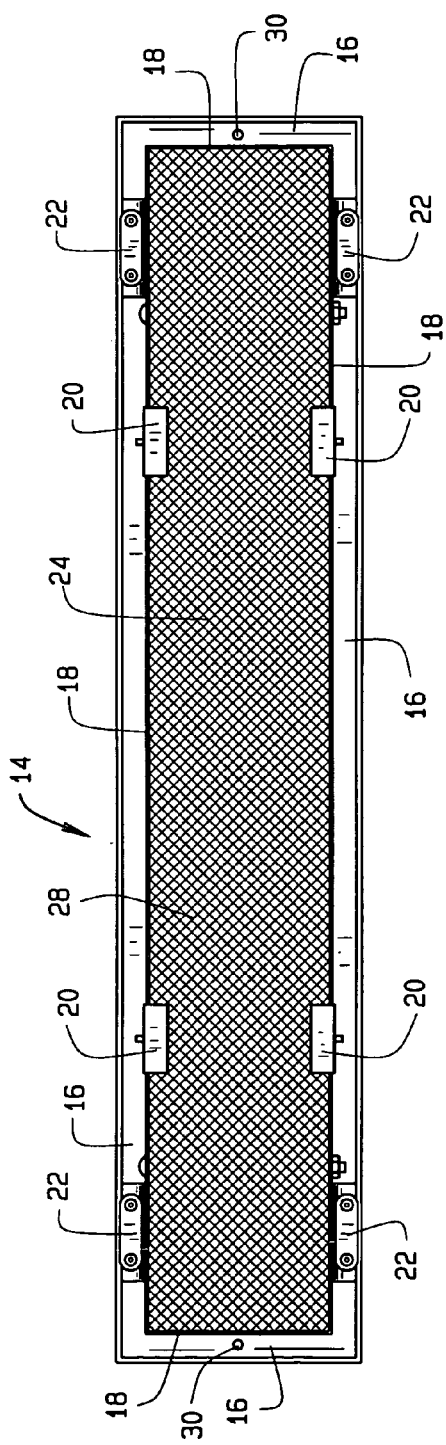
FIG. 5 is a rear plan view of a grill insert according to an embodiment of the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

The preferred embodiment of the present invention comprises a grill fitted within a frame and having a removable filter element. The assembly is particularly suited to be used to cover a cold air return vent of a forced air heated and/or air conditioning system. In that regard and referring to FIGS. 1 and 2, there is shown a grill 10 according to an embodiment of the presenting invention. The grill 10 comprises an outer frame 12 and an inner, removable grill insert 14.

As shown in FIGS. 3, 4 and 5, the grill insert 14 comprises a frame 16 and a plurality of louvers 8. Extending from the frame 16 is a filter housing 18. The filter housing 18 is attached to four flanges 20 which extend outwardly from the filter housing 18 and turn inwardly toward one another. Four magnet blocks 22 are also attached to the frame 16.

Figure 6:
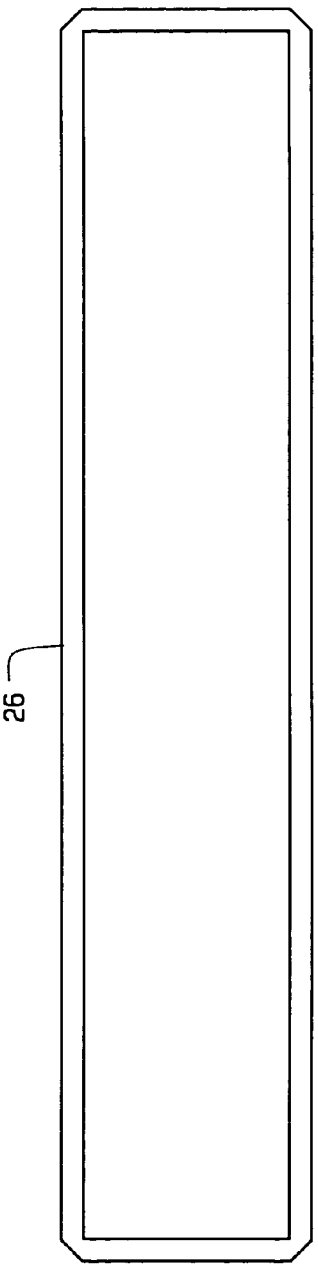
FIG. 6 is a front plan view of a filter loop according to an embodiment of the present invention.
Figure 7:
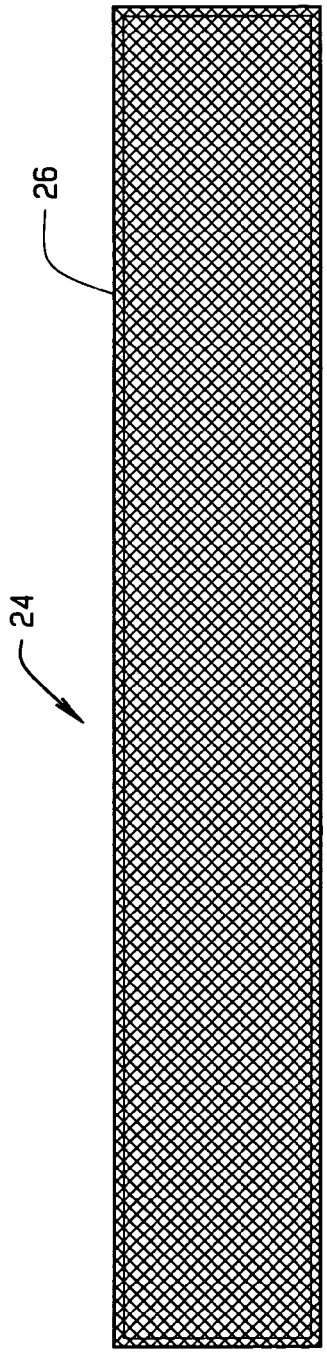
FIG. 7 is a front plan view of a filter according to an embodiment of the present invention.

Referring to FIGS. 6 and 7, fitted under the flanges 20 and within the filter housing 18 is a filter 24. The filter 24 comprises an outer loop 26 (FIG. 6) and is covered by a filter material 28 that traps pollutants.

Figure 8:
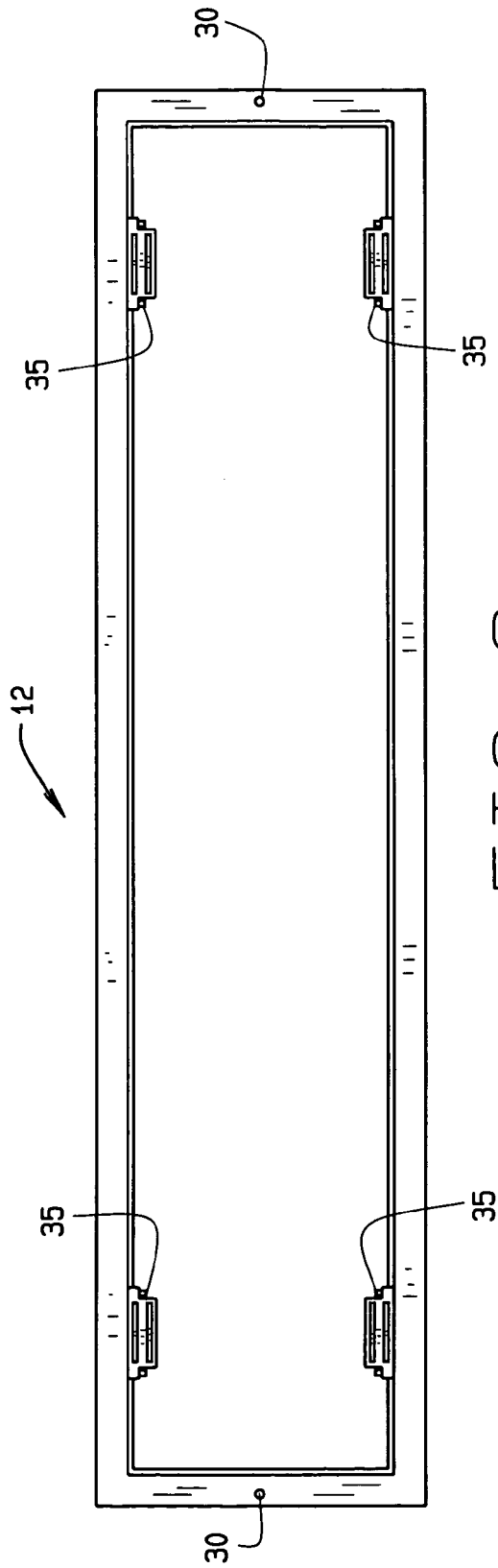
FIG. 8 is a front plan view of a frame assembly according to an embodiment of the present invention.
Figure 9:
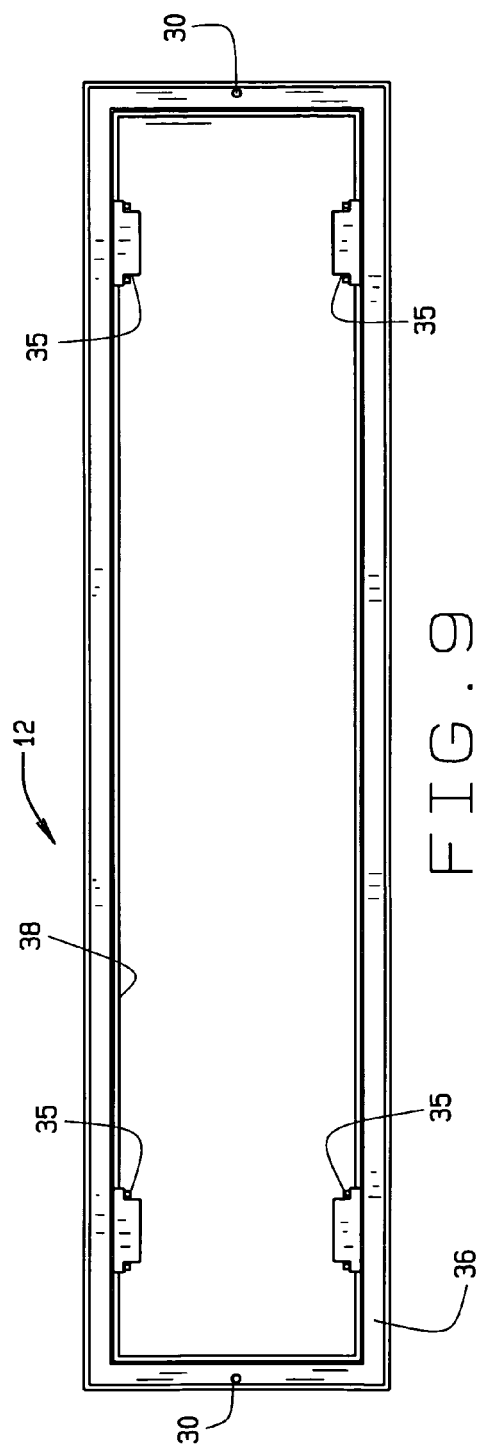
FIG. 9 is a rear plan view of a frame assembly according to an embodiment of the present invention.
Figure 10:
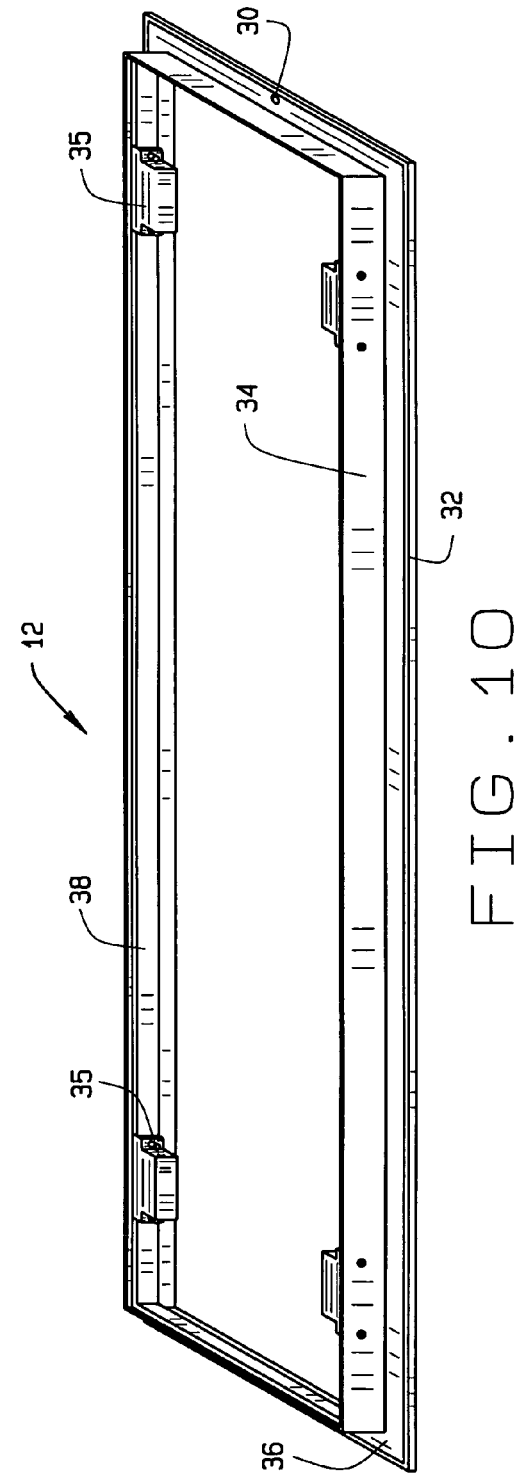
FIG. 10 is a side perspective view of a frame assembly according to an embodiment of the present invention.

The grill insert 14 is mounted within the outer frame 12 which comprises an outer frame 32 and a wall extension 34, as shown in FIGS. 8, 9 and 10. The wall extension 34 includes four magnets 35 that cooperate with the magnet blocks 22 to hold the grill insert 14 within the frame 12. The frame 12 also includes insulation strips 36 along the face thereof to seal against a wall and insulation strips 38 along the inner surface of the wall extension to seal between the grill insert 14 and the outer frame 12. The frame is mounted to a wall by inserting a fastener through two holes 30 in the frame 12.

The preferred embodiment is used by attaching the frame 12 to a wall over a cold air return of a HVAC system using two screws. The grill insert 14 may be removed from the wall by separating the magnets 35 from the magnet blocks 22. The wall extensions 34 and the filter housing 18 are sized such that they are no longer than the thickness of a standard sheet of drywall, which is typically ½" of an inch. The filter 24 may be removed from the grill insert 14 by flexing the filter 24 slightly by pushing on the filter 24 with one's hands through the gaps between the louvers 8. Once the filter 24 has been flexed, it may be slid out from under the flanges 20 and replaced or cleaned.

The above examples show that the invention, as defined by the claims, has far ranging application and should not be limited merely to the embodiments shown and described in detail. Instead the invention should be limited only to the explicit words of the claims, and the claims should not be arbitrarily limited to embodiments shown in the specification. The scope of protection is only limited by the scope of the accompanying claims, and the Examiner should examine the claims on that basis.

I claim:

1. A grill and filter assembly having a replaceable filter element, the assembly comprising:

a frame assembly having an outer frame forming a face and an wall extending substantially orthogonally from the outer frame;
a grill insert comprising:
a plurality of louvers;
a filter housing; and
a plurality of flanges extending inwardly from the filter housing;
a filter assembly comprising a loop covered with a fabric filter material; the loop capable of flexure, the filter assembly insertable within the filter housing and under the flanges, wherein the flanges and filter housing are structurally adapted to allow the filter assembly to be flexed and slid from under the flanges to remove it from the grill insert; and
a plurality of magnets attached to the frame assembly wall and located to magnetically hold the grill insert within the frame assembly.

2. The grill and filter assembly of claim 1 wherein the frame assembly is attached to a wall with mechanical fasteners through two holes in the frame assembly outer frame.

3. A grill and filter assembly having a replaceable filter element, assembly comprising:
a frame assembly having an outer frame forming a face and a wall extending substantially orthogonally from the outer frame to form a grill insert receiving window;
a grill insert sized and structured to be removably retainable within the grill insert receiving window and comprising:
a plurality of louvers;
a filter assembly housing; and
a plurality of spaced apart filter retention flanges mounted to sidewalls of the filter assembly housing and extending inwardly toward a center of the filter assembly housing;
a filter assembly comprising a loop covered with a fabric filter material; the loop capable of flexure, the filter assembly sized and structured to be removably insertable within the filter housing and removably retainable under the filter retention flanges, wherein the filter assembly housing is sized, and the retention flanges are located along the filter assembly housing sidewalls, such that the filter assembly can be flexed and slid from under the retention flanges to remove it from the grill insert; and
a plurality of magnets attached to the frame assembly wall and located to magnetically retain the grill insert within the frame assembly grill insert receiving window.

4. The grill and filter assembly of claim 3 wherein the frame assembly is attached to a wall with mechanical fasteners through two holes in the frame assembly outer frame.

5. A grill and filter assembly having a replaceable filter element, the assembly consisting of:
a frame assembly having an outer frame forming a face and an wall extending substantially orthogonally from the outer frame;
a grill insert comprising a plurality of louvers, a filter housing having a plurality of sidewalls, and a plurality of flanges extending inwardly from the filter housing sidewalls, the filter housing sidewalls having a lateral length that is no greater than the thickness of standard drywall;
a filter assembly comprising a loop covered with a fabric filter material; the loop capable of flexure, the filter assembly insertable within the filter housing and under the flanges;
a plurality of magnets attached to the frame assembly wall and located to magnetically hold the grill insert within the frame assembly;
wherein the flanges and filter housing are structurally adapted to allow the filter assembly to be flexed and slid from under the flanges to remove it from the grill insert.

6. The grill and filter assembly of claim 5 wherein the frame assembly is attached to a wall with mechanical fasteners through two holes in the frame assembly outer frame.

7. The grill and filter assembly of claim 1 further comprising a plurality of magnetic blocks mounted to a grill frame of the grill insert and located along the grill frame to correspond with a location of the magnets attached along the frame assembly wall, such that the magnets and magnetic blocks magnetically couple when the grill insert is placed in frame assembly, thereby removably retaining the grill insert within the frame assembly.

8. The grill and filter assembly of claim 1 further comprising an insulation strip attached to a back face of the outer frame of the frame assembly to seal against a wall to which the frame assembly is mounted.

9. The grill and filter assembly of claim 1 further comprising an insulation strip attached along an inner surface of the frame assembly wall provide a seal between frame assembly wall and the filter assembly housing.

10. The grill and filter assembly of claim 3 further comprising a plurality of magnetic blocks mounted to a grill frame of the grill insert and located along the grill frame to correspond with a location of the magnets attached along the frame assembly wall, such that the magnets and magnetic blocks magnetically couple when the grill insert is placed in the grill insert receiving window, thereby removably retaining the grill insert within the frame assembly.

11. The grill and filter assembly of claim 3 further comprising an insulation strip attached to a back face of the outer frame of the frame assembly to seal against a wall to which the frame assembly is mounted.

12. The grill and filter assembly of claim 3 further comprising an insulation strip attached along an inner surface of the frame assembly wall that forms the grill insert receiving window to provide a seal between frame assembly wall and the sidewalls of the grill insert filter assembly housing.

13. The grill and filter assembly of claim 5 further comprising a plurality of magnetic blocks mounted to a grill frame of the grill insert and located along the grill frame to correspond with a location of the magnets attached along the frame assembly wall, such that the magnets and magnetic blocks magnetically couple when the grill insert is placed in frame assembly, thereby removably retaining the grill insert within the frame assembly.

14. The grill and filter assembly of claim 5 further comprising an insulation strip attached to a back face of the outer frame of the frame assembly to seal against a wall to which the frame assembly is mounted.

15. The grill and filter assembly of claim 5 further comprising an insulation strip attached along an inner surface of the frame assembly wall provide a seal between frame assembly wall and the sidewalls of the grill insert filter assembly housing.

* * * * *

UNITED STATES PATENT AND TRADEMARK OFFICE
CERTIFICATE OF CORRECTION

PATENT NO. : 7,575,617 B2
APPLICATION NO. : 11/383628
DATED : August 18, 2009
INVENTOR(S) : Gary D. Ferguson Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 409 days.

Signed and Sealed this

Seventh Day of September, 2010

David J. Kappos
*Director of the United States Patent and Trademark Office*